United States Patent
Kubo

(10) Patent No.: US 11,801,570 B2
(45) Date of Patent: Oct. 31, 2023

(54) LASER PROCESSING MACHINE

(71) Applicant: MITUTOYO CORPORATION, Kanagawa (JP)

(72) Inventor: Koji Kubo, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 17/100,022

(22) Filed: Nov. 20, 2020

(65) Prior Publication Data

US 2021/0170523 A1    Jun. 10, 2021

(30) Foreign Application Priority Data

Dec. 4, 2019   (JP) .................................. 2019-219423

(51) Int. Cl.
*B23K 26/06*   (2014.01)
*B23K 26/0622*   (2014.01)
(Continued)

(52) U.S. Cl.
CPC ........ *B23K 26/0648* (2013.01); *B23K 26/032* (2013.01); *B23K 26/046* (2013.01); *B23K 26/066* (2015.10); *B23K 26/0622* (2015.10)

(58) Field of Classification Search
CPC ............ B23K 26/0622; B23K 26/0648; B23K 26/066; B23K 26/032; B23K 26/046; B23K 26/04; G02B 15/14
See application file for complete search history.

(56) References Cited

U.S. PATENT DOCUMENTS

| 4,830,498 A | * | 5/1989 | Nishimoto | ............... G01C 3/32 356/400 |
| 6,355,908 B1 | * | 3/2002 | Tatah | ..................... B23K 26/04 219/121.81 |

(Continued)

FOREIGN PATENT DOCUMENTS

| JP | 2003-251476 | 9/2003 |
| JP | 2003290965 A | * 10/2003 |

(Continued)

OTHER PUBLICATIONS

Notice of Allowance Issued in Corresponding JP Patent Application No. 2019-219423, dated Aug. 22, 2023, along with an English translation thereof.

*Primary Examiner* — John J Norton
*Assistant Examiner* — Franklin Jefferson Wang
(74) *Attorney, Agent, or Firm* — Greenblum & Bernstein, P.L.C.

(57) ABSTRACT

A laser processing machine includes: a variable focal length optical system in which a focus position is periodically changed in response to a drive signal to be inputted; a position-detection light source configured to emit a detection light onto a workpiece through the variable focal length optical system; a light detector configured to receive the detection light reflected on the workpiece and output a light detection signal; a signal processor configured to output a synchronization pulse signal in synchronization with the focus timing when the detection light is focused on the surface of the workpiece in accordance with the inputted light detection signal; and a laser oscillator configured to oscillate a pulse laser beam in accordance with the inputted synchronization pulse signal to radiate the pulse laser beam on the workpiece through the variable focal length optical system.

5 Claims, 3 Drawing Sheets

(51) Int. Cl.
*B23K 26/066* (2014.01)
*B23K 26/03* (2006.01)
*B23K 26/046* (2014.01)

(56) References Cited

U.S. PATENT DOCUMENTS

| | | | |
|---|---|---|---|
| 10,950,471 B2* | 3/2021 | Shionoya | B23K 26/0006 |
| 2003/0227614 A1 | 12/2003 | Taminiau et al. | |
| 2010/0032418 A1* | 2/2010 | Kuno | B28D 5/0011 |
| | | | 219/121.72 |
| 2015/0145980 A1* | 5/2015 | Bryll | G02B 21/241 |
| | | | 348/79 |
| 2017/0320165 A1* | 11/2017 | Hyakumura | B23K 26/046 |
| 2018/0314042 A1* | 11/2018 | Igasaki | G02B 3/0087 |
| 2019/0076959 A1* | 3/2019 | Izumi | B23K 26/36 |

FOREIGN PATENT DOCUMENTS

| | | | | |
|---|---|---|---|---|
| JP | 2005214721 A | * | 8/2005 | |
| JP | 2012-055910 | | 3/2012 | |
| JP | 2012055910 A | * | 3/2012 | |
| JP | 2015020187 A | * | 2/2015 | |
| JP | 2017-223651 | | 12/2017 | |
| JP | 2018-084821 | | 5/2018 | |
| JP | 2018084821 A | * | 5/2018 | ............ B41F 27/105 |
| KR | 20170137435 A | * | 12/2017 | |
| WO | 2016/121685 | | 8/2016 | |

* cited by examiner

LASER PROCESSING MACHINE

The entire disclosure of Japanese Patent Application No. 2019-219423 filed Dec. 4, 2019 is expressly incorporated by reference herein.

TECHNICAL FIELD

The present invention relates to a laser processing machine using a variable focal length optical system.

BACKGROUND ART

In a field of manufacturing FPD (Flat Panel Display), IC (Integrated Circuit) wafers and the like, a laser processing machine for laser-processing a workpiece while observing the workpiece in order to correct defects in a minute circuit has been typically known (for instance, see Patent Literature 1: JP 2012-55910 A). In such a laser processing machine, an optical system such as an objective lens is shared between an observation optical system and a laser processing optical system, and a laser oscillator radiates laser beam on a workpiece disposed in a field of view of the observation optical system through a laser-processing mask disposed in the laser processing optical system.

Moreover, an image detection technique using a variable focal length optical system in which a focus position is periodically changed has been typically known (for instance, see Patent Literature 2: JP 2018-84821 A). This image detection technology provides a focal sweep image by taking images while cyclically changing the focus position with respect to a target object. This image, which is a mixed image of a focused state and a defocused state, is subjected to a deconvolution processing, whereby an EDOF image (Extended Depth Of Focus image) is generated. In this EDOF image, an effective depth of focus that is several times to several tens of times higher than a normal depth of focus can be obtained, so that a frequency of re-focusing operations required due to an inclination, step or the like on the workpiece can be reduced.

The inventors are seeking the possibility of applying the above-described variable focal length optical system to the laser processing machine described in Patent Literature 1 and the like.

However, in an arrangement in which the laser processing optical system is incorporated in the variable focal length optical system, the focus position of the laser processing optical system with respect to the workpiece changes. For this reason, it is difficult to accurately concentrate a laser beam on a desired point of a surface of the workpiece, thereby adversely reducing accuracy of the laser processing.

SUMMARY OF THE INVENTION

An object of the invention is to provide a laser processing machine capable of performing a highly accurate laser processing while using a variable focal length optical system.

According to an aspect of the invention, a laser processing machine includes: a variable focal length optical system whose focus position is periodically changed in response to an inputted drive signal; a light source configured to radiate a detection light on a workpiece through the variable focal length optical system; a light detector configured to receive the detection light reflected on the workpiece and output a light detection signal; a signal processor configured to output a synchronization pulse signal in synchronization with a focusing timing when the detection light is focused on a surface of the workpiece in accordance with the inputted light detection signal; and a laser oscillator configured to oscillate a pulsed laser beam in accordance with the inputted synchronization pulse signal and radiate the pulsed laser beam on the workpiece through the variable focal length optical system.

The laser processing machine of the above arrangement preferably further includes a laser-processing mask disposed at a position satisfying a conjugate relationship with the focus position of the variable focal length optical system between the variable focal length optical system and the laser oscillator, the laser-processing mask having an aperture through which the pulsed laser beam passes.

In the laser processing machine of the above arrangement, it is preferable that the light detector is disposed such that the light detection signal shows a peak when the focus position of the variable focal length optical system coincides with a surface of the workpiece, and the signal processor detects the peak of the light detection signal as the focusing timing and outputs the synchronization pulse signal in synchronization with the focusing timing.

The laser processing machine of the above arrangement preferably further includes: an image sensor configured to take an image of the workpiece through the variable focal length optical system, in which the variable focal length optical system includes: a liquid resonant lens whose refractive index is periodically changed in response to the inputted drive signal; an objective lens disposed on the same optical axis as that of the liquid resonant lens; and a plurality of relay lenses disposed such that an exit pupil of the objective lens is conjugate to a position of a principal point of the liquid resonant lens.

BRIEF DESCRIPTION OF DRAWING(S)

FIG. 1 schematically illustrates a laser processing machine according to an exemplary embodiment of the invention.

DESCRIPTION OF EMBODIMENT(S)

Exemplary embodiment(s) of the invention will be described with reference to the attached drawings.

Figure 1:
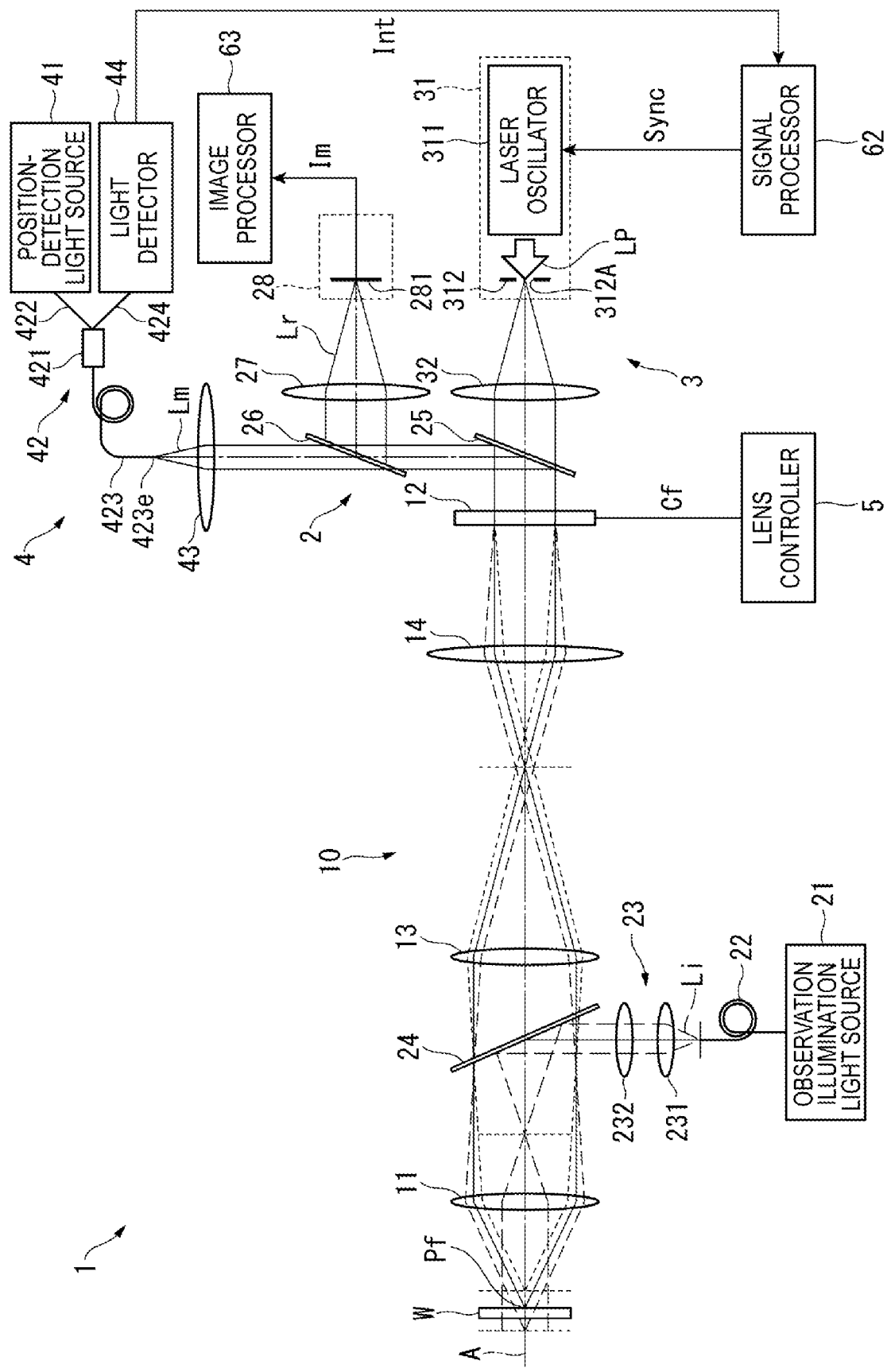

As shown in FIG. 1, a laser processing machine 1 includes: an observation optical system 2 for observing a workpiece W; a laser processing optical system 3 for laser-processing a surface of the workpiece W; and a timing detection optical system 4 for detecting a timing of laser processing, the optical systems 2, 3 and 4 sharing a variable focal length optical system 10 including a liquid resonant lens 12. The surface of the workpiece W is arranged so as to intersect with an optical axis A passing through the variable focal length optical system 10.

Figure 2:
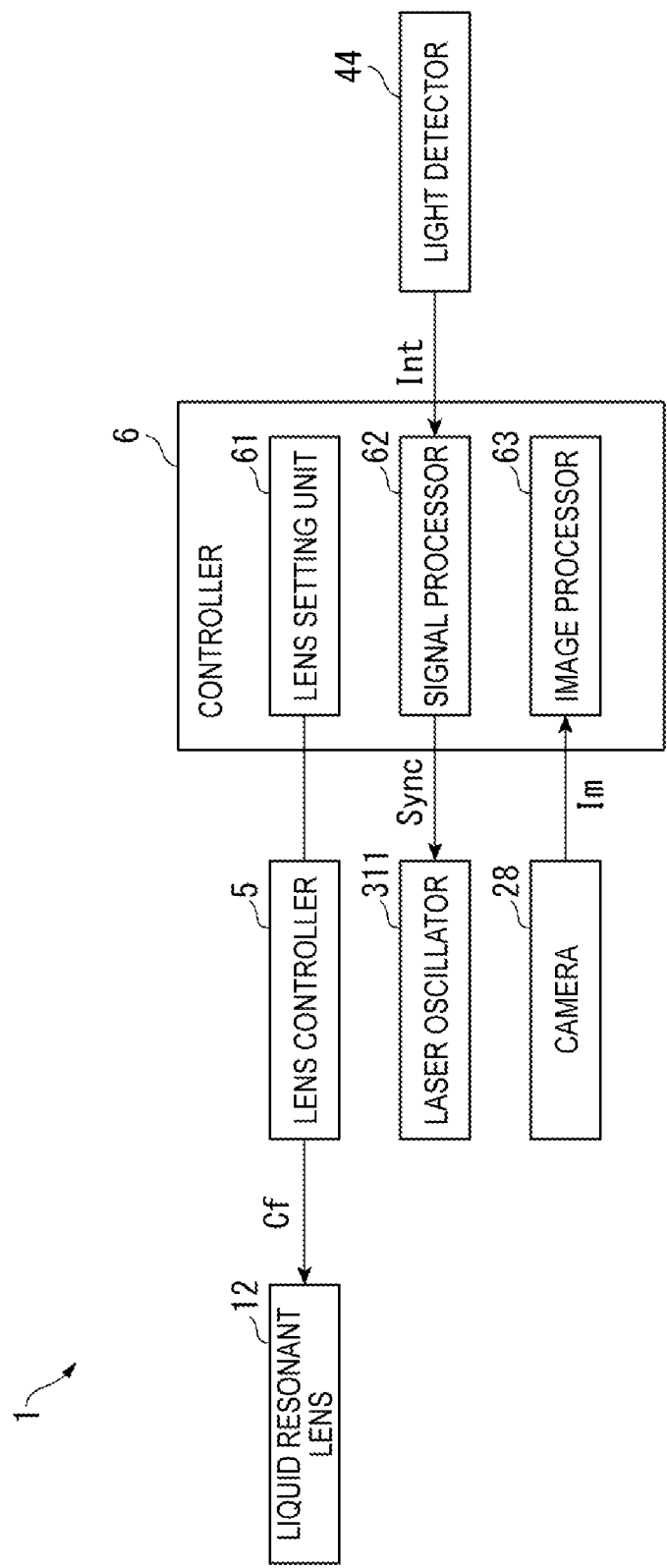
FIG. 2 is a block diagram showing the laser processing machine according to the exemplary embodiment.

Moreover, the laser processing machine 1 further includes: a lens controller 5 configured to control an operation of the liquid resonant lens 12; and a controller 6 (see FIG. 2).

Variable Focal Length Optical System

Firstly, the variable focal length optical system 10 will be described.

As shown in FIG. 1, the variable focal length optical system 10 includes an objective lens 11, the liquid resonant lens 12, and relay lenses 13, 14, which are disposed on the optical axis A.

The objective lens 11 is in a form of an existing convex lens or a group of lenses.

The liquid resonant lens 12 includes a cylindrical case filled with a liquid (e.g., silicone) and a cylindrical oscillator formed of a piezoelectric material. This oscillator, which is connected through a signal wire to the external lens controller 5 while being immersed in the liquid inside the case, oscillates in response to a drive signal Cf inputted from the lens controller 5. The drive signal Cf is, for instance, a sinusoidal alternating-current signal. When a frequency of the drive signal Cf is adjusted to a resonant frequency, a standing wave is generated in the liquid inside the liquid resonant lens 12, so that a refractive index of the liquid resonant lens 12 is periodically changed.

A focus position Pf of the variable focal length optical system 10 on the workpiece W is periodically changed concurrently with the change in the refractive index of the liquid resonant lens 12 with reference to a focal length of the objective lens 11.

The relay lenses 13, 14 are disposed so as to conjugate an exit pupil of the objective lens 11 to a position of a principal point of the liquid resonant lens 12. A stop (not shown) is disposed at a position of an intermediate image between the relay lenses 13, 14. Since the relay lenses 13, 14 relay the exit pupil of the objective lens 11 while maintaining the telecentric optical system, a magnification of an image incident on an image sensor (described later) is constant irrespective of the change in the focus position Pf.

Imaging Optical System

Next, the observation optical system 2 will be described.

The observation optical system 2 includes: in addition to the above-described variable focal length optical system 10, a light source 21 for observation illumination (hereinafter, referred to as an "observation illumination light source 21"); a light guide 22; an illumination optical system 23; beam splitters 24 to 26; an imaging lens 27; and a camera 28.

The observation illumination light source 21, which includes a light emission device such as LED, emits illumination light Li (continuous light).

The light guide 22, which includes an optical fiber and the like, transmits the illumination light Li emitted from the observation illumination light source 21 to the illumination optical system 23.

The illumination optical system 23, which includes a collector lens 231, a condenser lens 232 and the like, adjusts as needed the illumination light Li transmitted through the light guide 22.

The beam splitter 24, which is disposed on the optical axis A on an image-side of the objective lens 11, reflects the illumination light Li adjusted by the illumination optical system 23, thereby guiding the illumination light Li to the objective lens 11. The illumination light Li is radiated onto the workpiece W through the objective lens 11.

The beam splitter 25 is disposed on the optical axis A on an image-side of the liquid resonant lens 12. The beam splitter 25 reflects a reflected light Lr, which has been reflected on the surface of the workpiece W and has passed through the variable focal length optical system 10, to guide the reflected light Lr to the beam splitter 26.

The beam splitters 24, 25 transmit light passing along the optical axis A of the variable focal length optical system 10.

The beam splitter 26 reflects the reflected light Lr reflected by the beam splitter 25 to guide the reflected light Lr to the imaging lens 27. The beam splitter 26, which has wavelength selectivity, transmits a detection light Lm while reflecting the reflected light Lr derived from the illumination light Li.

The imaging lens 27, which forms an infinite correction optical system in conjunction with the relay lens 14 of the variable focal length optical system 10, allows the reflected light Lr that has passed through the beam splitters 25, 26 to form an image on an image sensor 281 described later.

The camera 28, which has the image sensor 281 such as CCD (Charge Coupled Device) image sensor, outputs an image Im taken by the image sensor 281 to an image processor 63 in a predetermined signal format. Herein, a frame rate of the camera 28 is set lower than a frequency of the drive signal Cf input to the liquid resonant lens 12. Accordingly, the image Im is a mixed image of a focused state and a defocused state due to a relationship between a change cycle of the focus position Pf and the frame rate of the camera 28.

Laser Processing Optical System

Next, the laser processing optical system 3 will be described.

The laser processing optical system 3 includes, in addition to the above-described variable focal length optical system 10, a laser head 31 and a laser imaging lens 32.

The laser head 31 includes a laser oscillator 311 and a laser-processing mask 312 (i.e., a mask for laser processing).

The laser oscillator 311 oscillates a pulsed laser beam Lp having a wavelength suitable for processing the workpiece W. Moreover, the laser oscillator 311 is configured such that a timing of oscillating the pulsed laser beam Lp is controlled by a synchronization pulse signal Sync described later.

The laser-processing mask 312 has an aperture 312A having a predetermined shape (e.g., circular shape) and narrows a diameter of the pulsed laser beam Lp oscillated from the laser oscillator 311 to a desired size.

The laser imaging lens 32 is disposed between the variable focal length optical system 10 and the laser head 31 on the optical axis A and forms the infinite correction optical system in conjunction with the relay lens 14 of the variable focal length optical system 10.

Here, the laser-processing mask 312 is disposed at a rear focal point of the laser imaging lens 32. Specifically, the laser-processing mask 312 is disposed on the optical axis A at a position satisfying a conjugate relationship to the focus position Pf of the variable focal length optical system 10.

A behavior of the pulsed laser beam Lp in the laser processing optical system 3 will be described later.

Timing Detection Optical System

Next, the timing detection optical system 4 will be described.

The timing detection optical system 4, which is an optical system for detecting a timing when the laser oscillator 311 oscillates the pulsed laser beam Lp, includes a position-detection light source 41, a light guide 42, a collimator lens 43, and a light detector 44 in addition to the variable focal length optical system 10.

The position-detection light source 41, which is exemplified by a laser beam source, emits the detection light Lm (continuous light).

The light guide 42 includes a fiber splitter 421 and optical fibers 422 to 424. The fiber splitter 421, which has an optical path connected with a first end of each of the optical fibers 422 to 424, guides light input through the optical fiber 422 to the optical fiber 423 and guides the light input through the optical fiber 423 to the optical fiber 424.

A second end of the optical fiber 422 is connected to the position-detection light source 41. Accordingly, the detection light Lm emitted from the position-detection light source 41 is transmitted through the light guide 42 to be emitted from an end surface 423e of a second end of the optical fiber 423. In other words, the end surface 423e of the optical fiber 423 functions as a point light source of the detection light Lm.

A second end of the optical fiber 424 is connected to the light detector 44. Accordingly, the detection light Lm incident on the end surface 423e of the optical fiber 423 is transmitted through the light guide 42 to enter the light detector 44.

Here, the end surface 423e of the optical fiber 423 is disposed at a rear focal point of the collimator lens 43. Specifically, the end surface 423e of the optical fiber 423 is disposed on the optical axis A at a position satisfying a conjugate relationship to the focus position Pf of the variable focal length optical system 10.

The collimator lens 43 collimates the detection light Lm emitted through the end surface 423e of the optical fiber 423. The detection light Lm collimated by the collimator lens 43 passes through the beam splitter 26 and is reflected on the beam splitter 25, thereby being radiated on the workpiece W through the variable focal length optical system 10.

The collimator lens 43 also concentrates the detection light Lm that is reflected on the surface of the workpiece W and passes through the variable focal length optical system 10.

The light detector 44, which is exemplified by a photomultiplier and a photodiode, is connected to the second end of the optical fiber 424. The light detector 44 receives the detection light Lm input through the optical fiber 424 and outputs the light detection signal Int corresponding to a light reception intensity.

In the above timing detection optical system 4, the focus position Pf of the variable focal length optical system 10 is periodically changed as described above. For this reason, only when the focus position Pf coincides with the surface of the workpiece W, the detection light Lm reflected on the surface of the workpiece W forms a spot at the rear focal point of the collimator lens 43 and is incident on the end surface 423e of the optical fiber 423.

Accordingly, the detection light Lm incident on the light detector 44 is maximized when the focus position Pf coincides with the surface of the workpiece W. In other words, the light detection signal Int outputted from the light detector 44 shows a peak when the focus position Pf coincides with the surface of the workpiece W.

Controller

The controller 6 shown in FIG. 2 is exemplified by a computer having CPU (Central Processing Unit) and a memory. The controller 6, which achieves a predetermined function by running predetermined software, includes a lens setting unit 61 configured to set the lens controller 5, a signal processor 62 configured to process various inputted signals, and an image processor 63.

The lens setting unit 61 sets a frequency, an amplitude and the maximum drive voltage of the drive signal Cf in the lens controller 5.

The resonant frequency of the liquid resonant lens 12 changes depending on a change in the ambient temperature and the like. Accordingly, the lens setting unit 61 changes the frequency of the drive signal Cf in real time by feedback control to achieve a stable operation of the liquid resonant lens 12.

The signal processor 62 outputs the synchronization pulse signal Sync to the laser oscillator 311. The signal processor 62 also switches High/Low of the synchronization pulse signal Sync in accordance with the inputted light detection signal Int.

The image processor 63 applies a deconvolution processing to the image Im inputted from the camera 28 to generate an EDOF image. The deconvolution processing, which applies an inverse operation of an out-of-focus component estimated in a variable range of the focus position Pf to the image Im, is performed to generate an EDOF image focused on substantially all the variable range of the focus position Pf.

Laser Processing Operation

Next, the laser processing operation in the present exemplary embodiment will be described.

Figure 3:
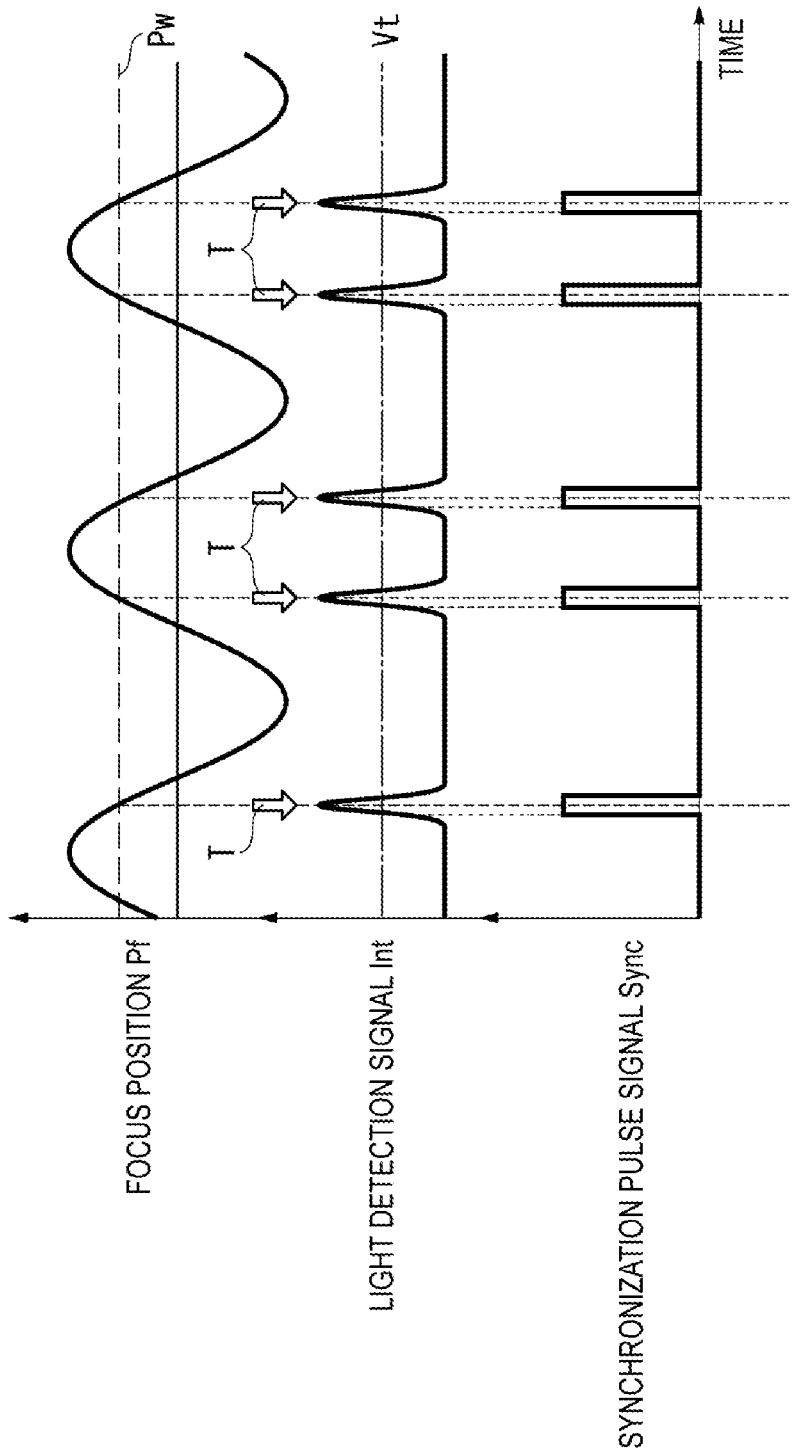
FIG. 3 is a graph for explaining the laser processing machine according to the exemplary embodiment.

During the operation of the liquid resonant lens 12, the focus position Pf of the variable focal length optical system 10 is periodically changed in synchronization with the drive signal Cf as shown in FIG. 3. It should be noted that FIG. 3 shows an exemplary surface position (workpiece position Pw) of the workpiece W in the variable range of the focus position Pf on the optical axis A.

The light detection signal Int shows a peak at a timing (focusing timing T) when the focus position Pf coincides with the workpiece position Pw (two peaks in one cycle of the drive signal Cf).

The synchronization pulse signal Sync is at a high level when the light detection signal Int is equal to or more than a threshold Vt and at a low level when the light detection signal Int is less than the threshold Vt.

The laser oscillator 311 oscillates the pulsed laser beam Lp at a timing when the inputted light detection signal Int is switched from the low level to the high level. Here, an output period of the pulsed laser beam Lp for one time is set to be sufficiently short relative to the change cycle of the focus position Pf, and the threshold Vt of the light detection signal Int is set so that the output period of the pulsed laser beam Lp overlaps the focusing timing T. By this setting, the laser oscillator 311 can emit the pulsed laser beam Lp in concurrence with the focusing timing T.

Referring back to FIG. 1, the pulsed laser beam Lp emitted from the laser oscillator 311 in concurrence with the focusing timing T passes through the aperture 312A of the laser-processing mask 312 to be radiated on the workpiece W through the laser imaging lens 32 and the variable focal length optical system 10.

Here, the laser-processing mask 312 is disposed at a position satisfying a conjugate relationship to the focus position Pf of the variable focal length optical system 10.

Accordingly, an image of a shape of the pulsed laser beam Lp passing through the laser-processing mask 312 is formed at the focus position Pf of the variable focal length optical system 10, in other words, on the surface of the workpiece W, at the focusing timing T.

Effects

As described above, the laser processing machine 1 in the present exemplary embodiment includes: the variable focal length optical system 10 in which the focus position Pf is periodically changed in response to the drive signal Cf; the position-detection light source 41 configured to emit the detection light Lm onto the workpiece W through the variable focal length optical system 10; the light detector 44 configured to receive the detection light Lm reflected on the workpiece W and output the light detection signal Int; the signal processor 62 configured to output the synchronization pulse signal Sync in synchronization with the focusing timing T when the detection light Lm is focused on the surface of the workpiece W in accordance with the inputted light detection signal Int; and the laser oscillator 311 configured to oscillate the pulsed laser beam Lp in accordance with the synchronization pulse signal Sync to radiate the pulsed laser beam Lp on the workpiece W through the variable focal length optical system 10.

With the above arrangement, the detection light Lm emitted from the position-detection light source 41 passes through the variable focal length optical system 10, thereby being radiated on the workpiece W while changing the focus position Pf present in a direction of the optical axis. Since the detection light Lm reflected on the workpiece W is received by the light detector 44 while being affected by the change in the focus position Pf, the light detection signal Int inputted from the light detector 44 includes the influence by the change in the focus position Pf. The signal processor 62, which can detect, on a basis of the light detection signal Int, a timing (focusing timing T) when the focus position Pf of the detection light Lm coincides with the surface of the workpiece W, outputs the synchronization pulse signal Sync in synchronization with the focusing timing T. Moreover, the laser oscillator 311 can emit the pulsed laser beam Lp in concurrence with the focusing timing T by oscillating the pulsed laser beam Lp in accordance with the synchronization pulse signal Sync inputted from the signal processor 62.

Accordingly, in the laser processing machine 1 of the present exemplary embodiment, since the pulsed laser beam Lp radiated on the workpiece W through the variable focal length optical system 10 is focused on the surface of the workpiece W, the pulsed laser beam Lp can be accurately concentrated on a desired position of the surface of the workpiece W. As a result, highly accurate laser processing can be performed while using the variable focal length optical system 10.

The laser processing machine 1 of the present exemplary embodiment also includes the laser-processing mask 312 formed with the aperture 312A through which the pulsed laser beam Lp passes. Since the laser-processing mask 312 is disposed at a position satisfying a conjugate relationship to the focus position Pf of the variable focal length optical system 10 between the variable focal length optical system 10 and the laser oscillator 311, a favorable image of an outline of the aperture 312A is formed on the surface of the workpiece W and a region in conformity with the outline of the aperture 312A is laser-processed.

Moreover, in the laser processing machine 1 of the present exemplary embodiment, the light detector 44 is disposed such that the light detection signal Int shows a peak when the focus position Pf in the variable focal length optical system 10 coincides with the surface of the workpiece W, and the signal processor 62 detects the peak of the light detection signal Int as the focusing timing T and outputs the synchronization pulse signal Sync in synchronization with the focusing timing T. In other words, the laser processing machine 1 of the present exemplary embodiment detects the focusing timing T by a confocal method. Accordingly, compared with a case where another focus detection method is used for detecting the focusing timing T, the confocal method is less likely to be affected by the surface texture such as inclination and roughness of the surface of the workpiece W, whereby the detection accuracy of the focusing timing T is improvable.

The laser processing machine 1 of the present exemplary embodiment further includes the image sensor 281 configured to take an image of the workpiece W through the variable focal length optical system 10, in which the variable focal length optical system 10 includes: the liquid resonant lens 12 whose refractive index is periodically changed in response to the drive signal Cf; the objective lens 11 disposed on the same optical axis as that of the liquid resonant lens 12; and a plurality of relay lenses 13, 14 positioned so that the exit pupil of the objective lens 11 is conjugate to the position of the principal point of the liquid resonant lens 12. With this arrangement, the workpiece W can be laser-processed with an image of the workpiece W being observed. In the present exemplary embodiment, since the EDOF image can be generated as the image of the workpiece W, a frequency of a re-focus operation for observing the image of the workpiece W is reducible.

Further, since the variable focal length optical system 10 in the present exemplary embodiment is arranged such that the exit pupil of the objective lens 11 and the principal point position of the liquid resonant lens 12 satisfy a conjugate relationship to each other, a magnification of an image incident on the image sensor 281 becomes constant even when the focus position Pf of the variable focal length optical system 10 changes. Accordingly, a favorable observation is possible without a change in a field of view.

Advantages of using the variable focal length optical system 10 in the laser processing machine 1 of the present exemplary embodiment are not only that the frequency of the re-focus operation in the observation optical system 2 is reducible but also that, when the surface of the workpiece W has a step and the like, the pulsed laser beam Lp can be focused on the surface of the workpiece W without adjusting a position of the workpiece W.

Modification(s)

It should be noted that the scope of the invention is not limited by the above-described exemplary embodiment, but encompasses modifications, improvements and the like compatible with an object of the invention.

In the above exemplary embodiment, a pinhole is usable in place of the light guide 42. Specifically, by using a pinhole for forming a point light source and a pinhole disposed at the rear focal point of the collimator lens 43, the focusing timing T can be detected by the confocal method in the same manner as in the above exemplary embodiment.

In the above exemplary embodiment, when a change in the field of view in the observation optical system 2 is of no problem, the relay lenses 13, 14 of the variable focal length optical system 10 may be omitted and each of the collimator lens 43, the imaging lens 27 and the laser imaging lens 32 may form the infinite correction optical system together with the objective lens 11. Alternatively, the relay lenses 13, 14, the collimator lens 43, the imaging lens 27 and the laser imaging lens 32 may be omitted and the objective lens 11 and the liquid resonant lens 12 may form a finite correction optical system.

In the above exemplary embodiment, although the confocal method is used for detecting the focusing timing T, the invention is not limited to the confocal method. Specifically, the focusing timing T may be detected by using various other focus detection methods such as a double pinhole method, an astigmatism method, and a knife edge method.

For instance, when the double pinhole method is used, the respective light detectors are provided before and after a light concentration position satisfying a conjugate relationship to the focus position Pf, and calculation is made based on the respective light detection signals from the light detectors, whereby the focusing timing T can be obtained. The signal processor 62 may output the synchronization pulse signal Sync in synchronization with the thus obtained focusing timing T.

In the above exemplary embodiment, the illumination light Li of the observation optical system 2, which is a continuous light, may be a pulsed light. In this case, the observation illumination light source 21 may emit a pulsed light in accordance with the synchronization pulse signal Sync in the same manner as in the laser oscillator 311. With this arrangement, the illumination light Li is radiated on the workpiece W at the focusing timing T and the camera 28 can obtain an image focused on the surface of the workpiece W.

The laser processing machine 1 in the above exemplary embodiment includes the observation optical system 2 for observing the workpiece W, but the invention is not limited to this arrangement. In other words, the invention may be applied to a laser processing machine without the observation optical system 2.

In the above exemplary embodiment, the signal processor 62 is formed in the controller 6, but may be formed in the lens controller 5. Alternatively, the lens controller 5 and the controller 6 may be formed as an integrated control device.

The drive signal Cf, which is in a sinusoidal waveform to cause sinusoidal oscillation at the focus position Pf in the above exemplary embodiment, may be a triangular waveform, saw-tooth waveform, rectangular waveform, or the like.

What is claimed is:

1. A laser processing machine comprising:
   a variable focal length optical system whose focus position is changed at each of regularly occurring intervals in response to an inputted drive signal;
   a light source configured to radiate a detection light on a workpiece through the variable focal length optical system;
   a light detector configured to receive the detection light reflected on the workpiece and output a light detection signal;
   a signal processor configured to output a synchronization pulse signal in accordance with the inputted light detection signal during a period during which the inputted light detection signal is equal to or more than a threshold, the synchronization pulse signal being in synchronization with a focusing timing when the detection light is focused on a surface of the workpiece in accordance with the inputted light detection signal; and
   a laser oscillator configured to oscillate a single pulse of a pulsed laser beam in accordance with each inputted synchronization pulse signal and radiate the pulsed laser beam on the workpiece through the variable focal length optical system.

2. The laser processing machine according to claim 1, further comprising:
   a laser-processing mask disposed at a position satisfying a conjugate relationship with the focus position of the variable focal length optical system between the variable focal length optical system and the laser oscillator, the laser-processing mask having an aperture through which the pulsed laser beam passes.

3. The laser processing machine according to claim 1, wherein
   the light detector is disposed such that the light detection signal shows a peak when the focus position of the variable focal length optical system coincides with a surface of the workpiece, and
   the signal processor detects the peak of the light detection signal as the focusing timing and outputs the synchronization pulse signal in synchronization with the focusing timing.

4. The laser processing machine according to claim 1, further comprising:
   an image sensor configured to take an image of the workpiece through the variable focal length optical system, wherein
   the variable focal length optical system comprises:
   a liquid resonant lens whose refractive index is periodically changed in response to the inputted drive signal;
   an objective lens disposed on the same optical axis as that of the liquid resonant lens; and
   a plurality of relay lenses disposed to relay an exit pupil of the objective lens while maintaining a telecentric optical system.

5. The laser processing machine according to claim 1, wherein
   the signal processor is further configured to output the synchronization pulse signal in synchronization with the focusing timing when the detection light is focused on a surface of the workpiece in accordance with the inputted light detection signal during the changing of the focus position of the variable focal length optical system.

* * * * *